United States Patent [19]
Hutchison

[11] 3,829,134
[45] Aug. 13, 1974

[54] ROTARY TUBULAR COUPLING

[75] Inventor: Stanley O. Hutchison, Bakersfield, Calif.

[73] Assignee: Chevron Research Company, San Francisco, Calif.

[22] Filed: July 24, 1972

[21] Appl. No.: 274,787

Related U.S. Application Data

[62] Division of Ser. No. 150,536, June 7, 1971, Pat. No. 3,720,264.

[52] U.S. Cl.............. 285/14, 285/190, 285/DIG. 2
[51] Int. Cl.......................... F16l 27/08, F16l 55/00
[58] Field of Search ........ 285/14, 190, 272, DIG. 2; 166/311, 312, 223, 302

[56] References Cited
UNITED STATES PATENTS

| | | | |
|---|---|---|---|
| 836,989 | 11/1906 | Oliver | 285/190 |
| 1,078,952 | 11/1913 | Prellwitz | 285/190 X |
| 1,499,851 | 7/1924 | Brown | 285/190 |
| 1,704,053 | 3/1929 | Miller | 285/190 X |
| 2,565,791 | 8/1951 | Wagner et al. | 285/190 X |
| 2,906,548 | 9/1959 | Faccou | 285/14 |
| 3,089,713 | 5/1963 | Scaramucci | 285/14 |

FOREIGN PATENTS OR APPLICATIONS
251,327  9/1912  Germany ........................... 285/190

Primary Examiner—Thomas F. Callaghan
Attorney, Agent, or Firm—Ralph L. Freeland, Jr.; Edward J. Keeling

[57] ABSTRACT

Method and apparatus for directionally applying high pressure jets to well liners to clean openings which are plugged with foreign matter. High velocity jets of liquid having a velocity in excess of 700 feet per second are jetted from jet orifices having a standoff distance between 5 and 10 diameters of the orifice from the openings to remove substantially all plugging material from the openings. Apparatus for circulating foam is provided in combination with apparatus for delivering high pressure jets. New swivels and check valves permit rotation and reciprocation of the jet tool and tubing string while maintaining high pressure in the apparatus.

1 Claim, 18 Drawing Figures

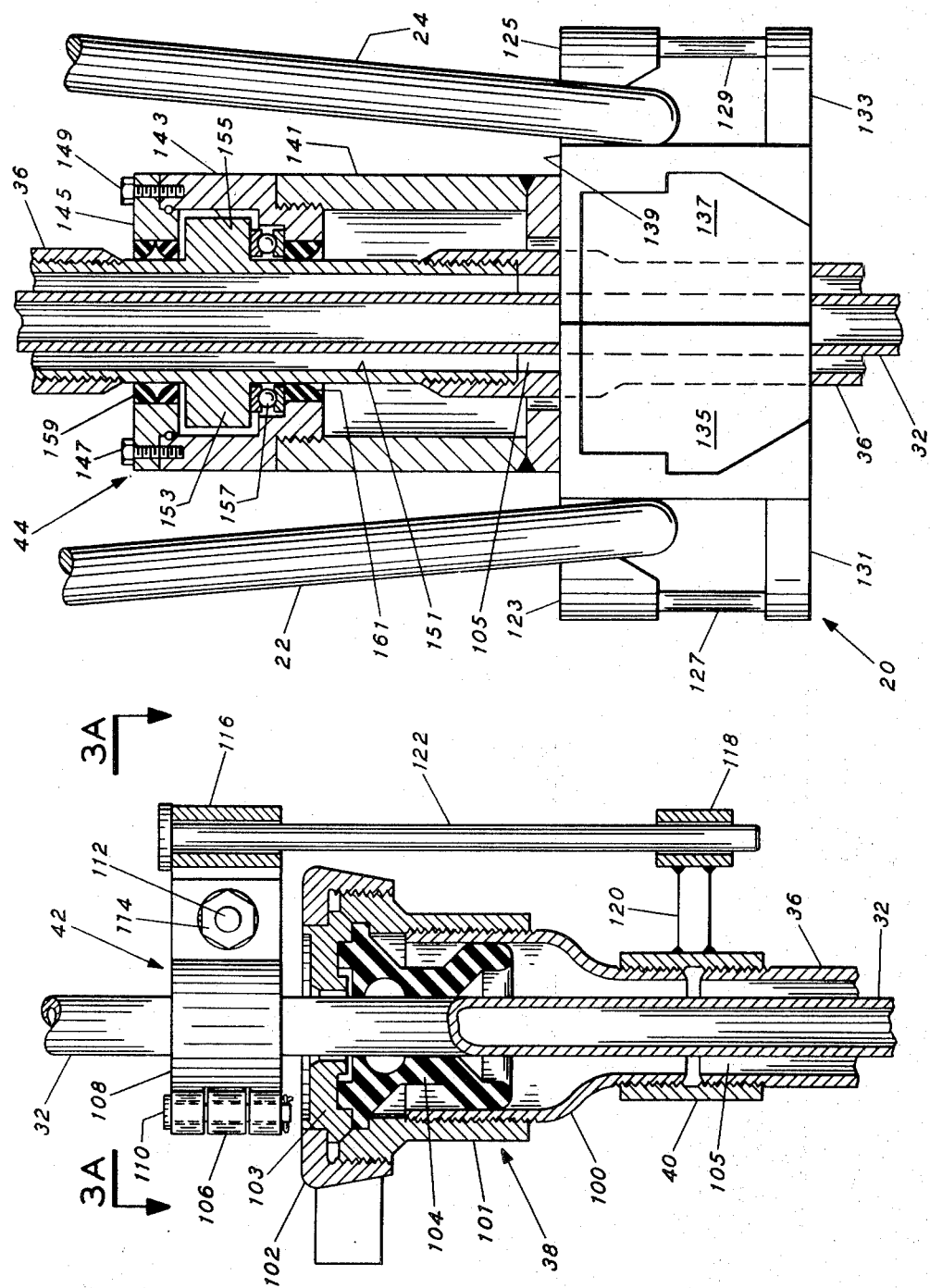

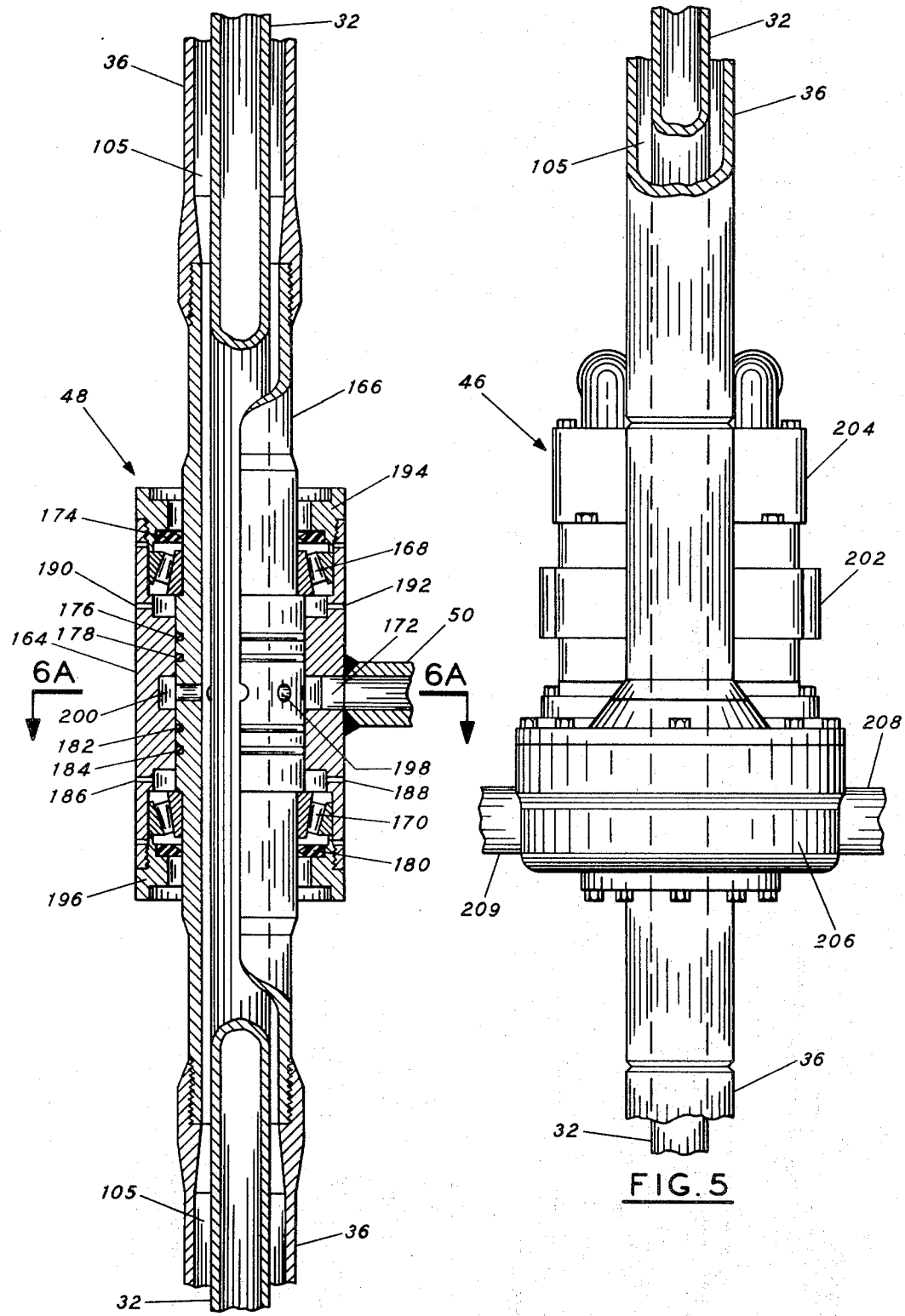

3,829,134

ROTARY TUBULAR COUPLING

This is a division of application Ser. No. 150,536, filed June 7, 1971, now U.S. Pat. No. 3,720,264.

BACKGROUND OF THE INVENTION

The present invention relates to cleaning openings in well liners positioned adjacent fluid producing formations using high velocity liquid jets and, more particularly, the present invention relates to methods and apparatus for use in removing plugging material from openings in oil well liners and the like with liquid jets having velocities in excess of 700 feet per second which are directed at the well liners through orifices having a standoff distance between the end of the orifice and the well liner of between 5 and 10 times the diameter of the orifice.

In the well producing art it is customary to complete an oil well or a water well adjacent a fluid producing formation by inserting a metallic well liner. Openings in the well liner provide passageways for flow of fluid such as oil or water and other formation fluids and material from the formation into the well for removal to the surface. However, the openings which, for example, may be slots preformed on the surface or perforations opened in the well, will often become plugged. This problem is especially serious in areas of viscous oil production from unconsolidated sand formations. Since it is highly desirable to prevent sand from entering the wlel, the liners used in this type of formation are often completed with narrow longitudinal slots. The slots prevent the entry of most of the sand with the oil, but in time they become plugged. Of course plugging is not limited only to slotted liners but also occurs in perforated liners even though the perforations may be considerably larger in size than the slots. In any event, removal and replacement of the liner is costly and is only a temporary solution since the liner will eventually again become plugged.

Sections of recovered plugged liners have been analyzed to determine the identity of the plugging material. Results have shown that the plugging material is mostly inorganic. Generally, it appears to be fine sand grains cemented together with oxides, sulfides and carbonates. Some asphaltenes and waxes are also present. Where water is produced, scale also seems to be present and presents a very tough plugging material.

Many methods for cleaning openings in well liners have been heretofore suggested. These methods include pumping a fluid between two or more opposed washer cups until the pressure builds up sufficiently to hydraulically dislodge the plugging material. Explosives such as primer cord (string shooting) have been used to form a high energy pressure shock wave to hydraulically or pneumatically blow the plugging material from the perforations. The disadvantages of these two methods are that the energy is applied nondirectionally to the liner and it always takes the path of least resistance. The use of these methods generally results in opening only one or two perforations out of a perforation row containing from 16 to 32 perforations.

Other prior art methods of cleaning the openings in liners include the use of mechanical scratches and brushes to cut, scrape or gouge the plugging material from the perforations. There are many disadvantages of these approaches. For example, the knives or wires in the brushes must be very thin to enter the slotted perforations which generally measures only 0.040 to 0.100 inches wide and, therefore, the knives and wires are structurally weak. Thus an insufficient amount of energy is generally applied to really unclog the perforations. Furthermore, the cleaning tool must be indexed so that the knives or wires actually hit a perforation. Since only 3 percent of the liner surface area is generally perforated, the chances are not favorable for contacting a perforation.

The use of chemicals such as solvents and acids have been used to dissolve the plugging materials. There are major disadvantages to the chemical approach. Thus the material plugging the perforations varies widely even in a well which requires a number of different chemicals to solubilize them. The combinations of plugging materials often inhibits the reaction of the chemicals. For example, an oil film will prevent an acid from dissolving a scale deposit and a scale deposit will prevent a solvent from being effective in dissolving heavy hydrocarbons. The chemicals cannot always be selectively placed where they are needed due to varying permeabilities encountered in a well bore and/or they dissolve the material in a few perforations and then the chemicals are lost into the formation where they can no longer be effective in cleaning the perforations.

Jetted streams of liquid have also been heretofore used to clean openings. The use of jets was first introduced in 1938 to directionally deliver acid to dissolve carbonate deposits. Relatively low velocities were used to deliver the jets. However, this delivery method did improve the results of acidizing. In about 1958 the development of tungsten carbide jets permitted including abrasive material in a liquid which improved the ability of a fluid jet to do useful work. The major use of abrasive jetting has been to cut notches in formations and to cut and perforate casing to assist in the initiation of hydraulically fracturing a formation. The abrasive jetting method requires a large diameter jet orifice. This large opening required an unreasonably large hydraulic power source in order to do effective work. The use of abrasives in the jet stream permitted effective work to be done with available hydraulic pumping equipment normally used for cementing oil wells. However, the inclusion of abrasive material in a jet stream was found to be an ineffective perforation cleaning method in that it enlarged the perforation which dstroyed the perforation's sand screening capability.

There is, therefore, still a need for a method of cleaning openings in a well liner which results in cleaning substantially the entire opening and which is a practical and relatively easy operation to perform. Further, there is need for a method of cleaning openings in such liners which does not destroy or alter the openings or damage th liner.

BRIEF DESCRIPTION OF THE INVENTION

Briefly, the present invention provides a method and apparatus for directionally applying a high pressure jet to a well liner to clean openings in the liner which are plugged with foreign matter. High pressure liquid jets having a velocity in excess of 700 feet per second are jetted at the liner from jet orifices having a standoff distance less than 10 times the diameter of the orifice to remove substantially all plugging material from the liner openings. Apparatus for concurrently circulating foam is provided in combination with the apparatus used to deliver the high pressure, high velocity jets. The foam may be used before, with or after the jets to remove material from the well. New swivels and check valves permit rotation and reciprocation of the work string in the well at high pressure conditions to permit directional application of the high kinetic energy in the jet.

In one aspect the present invention provides a method of jet cleaning openings in a well liner positioned adjacent a fluid producing formation. A flow path is formed from the earth's surface to a location adjacent a liner having plugged openings and high pressure liquid is flowed down such flow path. A jet is formed of the liquid adjacent the liner and is directed at the liner with a velocity of at least 700 feet per second to clean openings in the liner. The jet is formed from an orifice and is directed at the liner from a standoff distance of not more than 10 times the diameter of the jet as it leaves the orifice. It has been found that relatively small diameter orifices which produce jets of one-sixteenth of an inch or less are useful in the present invention. Thus a preferred orifice diameter for use in accordance with the invention is one thirty-second of an inch. The use of small diameter jets is very advantageous in that liquid volume requirements are lowered, thus lowering horsepower requirements and reducing the possiblity of formation damage in low pressure formations caused by liquid in the well overpowering the formation.

In another aspect, the method of the present invention provides for jet cleaning openings in a well liner which openings have become plugged from residual products from producing petroleum or other fluids which includes the use of foam in conjunction with the high pressure, high velocity liquid jet. Thus a first flow path from the earth's surface to a location adjacent a liner having plugged openings is formed and high pressure liquid is flowed down it and jetted at the well liner. A second flow path is also formed from the earth's surface down the well and terminates at a location below the terminal end of the first flow path in the well. The second flow path provides a path for flowing foam down the well to assist in removing matter from the well. This may occur either before, during or after the well has been cleaned with high pressure jets in accordance with the present invention. Thus foam may be used to remove sand from the well prior to jet cleaning the liner. Foam may also be circulated during jetting to remove the jetted liquid from the well to thus keep the well drawn down to prevent the jetted liquid from entering the formation. Foam is also useful after the jet cleaning operation to remove debris and liquid from the well.

The present invention provides apparatus for jet washing a well liner positioned adjacent a fluid producing formation to clean openings in a well liner which have become plugged during production from the well. A first tubing means forms a well flow path from the earth's surface to a location adjacent the well liner. The first tubing means has rotatably connected thereabout a rotating swivel. A source of high pressure liquid is connected to a flow path through the rotating swivel. An opening in the tubing means communicates with the flow path in the rotating swivel to provide a flow path into the interior of the tubing for the high pressure liquid. A jet tool is connected to the end of the tubing means adjacent the liner and is used to jet the high pressure liquid at openings in the liner to clean them.

In a more particular aspect the apparatus of the present invention is further characterized by a second tubing means arranged concentrically around the first tubing means. The second tubing means extends from the earth's surface to a location adjacent a liner in the well. A foam source is provided with conduit means connecting it with the second tubing means to provide foam for use in circulating in the well.

In another aspect the present invention includes a rotating swivel comprising a housing member having a central opening through its entire length with a mandril having a central opening through its entire length positioned in the central opening of the housing member. Means are provided to rotatably mount the mandril in the central opening of said housing member. An opening is formed intermediate the ends of said mandril to form a flow path from the outside of the mandril into the central opening of said mandril. Port means in said housing member communicate with the opening in the mandril. Means are provided for connecting a foam conduit to the port means.

In still another aspect, this invention is directed to a check valve useful to permit flow in one direction and prevent flow in the opposite direction in an annular passageway formed by two concentrically arranged tubing members. Thus a first tubing member having a central opening through its entire length and a second similar tubing member of larger diameter are concentrically arranged to form an annular passageway between the tubing members. A resilient member having one end mounted on the exterior of the first tubing member and the other end flared outwardly from the first tubing member to engage the inside wall of the second tubular member provides flow control in the annular space between the tubing members.

This invention also provides a jet tool for use in directing high velocity liquid jets at a well liner. The jet tool includes an inner tubular member having at least one hole in the wall thereof and a jet seat member fixedly connected to the tubular member and having a central opening aligned with the hole in the tubular member. A jet boty having a central opening formed therein is threadably engaged in said jet seat member to provide a jetting orifice for directing a high pressure jet.

In a more specific aspect the invention is directed to a jet tool which is useful both to jet clean a liner and to simultaneously provide foam for circulation in the liner annulus. An inner tubular member having a hole in the side wall thereof is provided with a jet seat having a central opening positioned over the hole. A second outside tubular member is connected to the jet seat and is concentrically arranged around the first tubular member. The second tubular member also has a hole which is coaxially aligned with the hole in the first tubular member. A jet body means having a central opening therein is seated in said jet seat member to permit jetting of liquid from the interior of the first tubular member through to the outside of the second tubular member. Foam can be circulated in the annulus between the two tubular members past the jet seat member before, during or after liquid is being jetted through the jet body.

PRINCIPAL OBJECT OF THE INVENTION

The principal object of the present invention is to provide a method and apparatus for directionally applying high velocity, high energy liquid jets to clean plugged well liners. Further objects and advantages of the present invention will become apparent from the drawings and detailed description.

BRIEF DESCRIPTION OF THE DRAWINGS

FIG. 3 is an elevation view, partially in section, and illustrates the safety clamp and rubber tubing stripper of the preferred embodiment of apparatus;

FIG. 4 is an elevation view, partially in section, and illustrates the elevators and rotating head of the preferred embodiment of apparatus;

FIG. 5 is an elevation view, with portions broken away for clarity of presentation, and illustrates the power rotating swivel of the preferred embodiment of apparatus;

FIG. 6 is an elevation view with portions broken away for clarity of presentation and illustrates the foam swivel of the preferred embodiment of apparatus;

DETAILED DESCRIPTION OF THE PREFERRED EMBODIMENT

Figure 1:
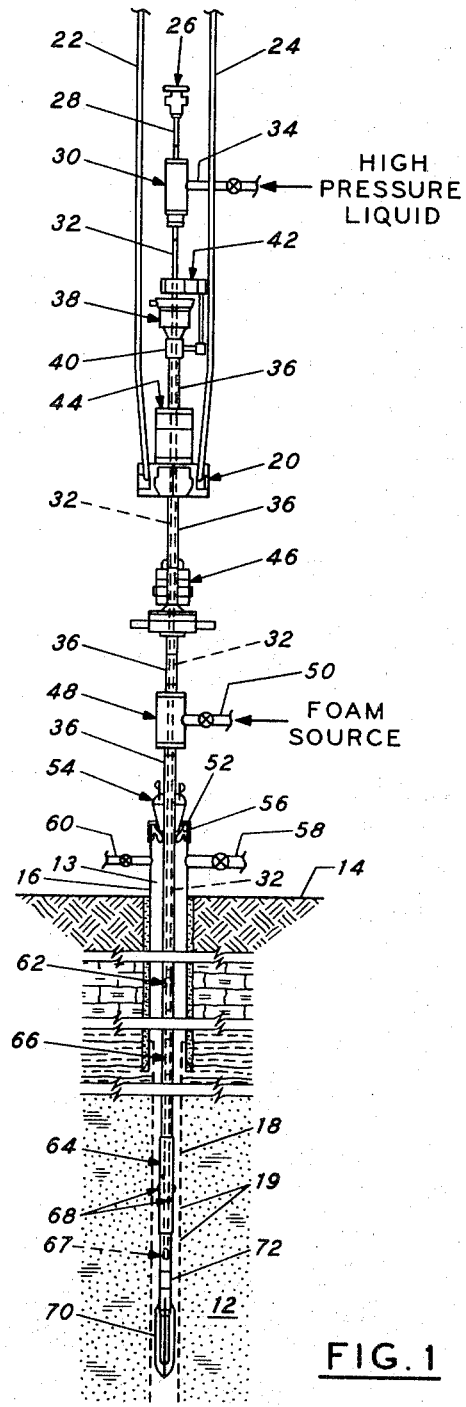
FIG. 1 is an elevation view, partially in section, illustrating the preferred embodiment of apparatus assembled in accordance with the present invention positioned in a well.

FIG. 1 is an elevation view, partially in section, and illustrates the preferred embodiment of apparatus assembled in accordance with the present invention positioned in a well. FIG. 1 thus illustrates the overall view of the preferred apparatus of the present invention. FIGS. 2 through 12 illustrate portions of the preferred apparatus in greater detail.

In FIG. 1 a well is shown drilled into a fluid producing formation 12 from the earth's surface 14. The upper portion of the well is cased with a suitable string of casing 16. A liner 18 having suitable openings 19 is hung from the casing and extends along the producing formation 12. The openings which may be slots or perforations permit flow of formation fluids from formation 12 into the interior of the well. As the formation fluids are produced, the openings in the slotted liner 18 tend to become plugged by depositions of scale, asphalt, clay and sand. The plugging material in the various slots at different elevations in the liner will vary in composition and, depending on the composition, will be more or less difficult to remove in order to reopen the slots. As the slots become plugged production from the well will tend to decline. Once it has been determined that the openings 19 in the well liner 18 have become plugged to the extent that cleaning is required for best operation of the well, the apparatus shown in FIG. 1 is assembled to accomplish such cleaning.

The present invention utilizes high velocity jets of liquid to clean plugged openings in well liners. The high kinetic energy of the jet is directionally applied to the openings by means of a rotatable and reciprocal jetting appratus. Thus the apparatus of the present invention can be rotated while jetting high pressure liquid jets at the liner. Additionally, the present apparatus may be concurrently raised or lowered in the well to provide for overall coverage of the liner by the jetted liquid.

The use of high velocity jets, i.e., above 700' second, permits maximum energy release to clean the openings of a liner with minimum volume of liquid. This is an important feature of the invention since accumulation of large amounts of liquid in the well can overpressure the producing formation and cause the liquid to flow into the formation causing formation damage. Additionally, the reduced volume of liquid made possible by the present invention greatly reduces horsepower requirements to move and jet the liquid.

In accordance with the invention a method of jet cleaning a well liner is provided by flowing high pressure liquid down a flow path from the earth's surface to a point adjacent the plugged openings in the liner. A jet of liquid is formed by passing the liquid through a small diameter jet orifice at a velocity of at least 700 feet per second and directing the jet of liquid at the liner to clean the slots thereof from a distance of between 5 and 10 diameters of the orifice. The jet is rotated and reciprocated in the liner to insure substantially complete coverage of the surface of the liner. This rotating and reciprocating is accomplished while the jet is simultaneously jetted against the liner to thereby clean the slots of the liner.

In accordance with one form of the invention, a second flow path in addition to the jet liquid flow path is concurrently formed from the earth's surface to a point below the orifice forming the jet. This second flow path is used to inject a circulating fluid, such as foam, in the well either before, during or after the jet cleaning. In the preferred form, the flow paths are arranged concentrically. Thus the jetting liquid is injected down a small diameter tubing and the foam is injected down the annulus between such small diameter tubing and a larger diameter tubing concentrically arranged thereabout. The use of foam in connection with the high pressure jets is especially advantageous to remove material from the well during the operation. It is particularly helpful in low pressure formations in that the liquid which has been jetted at the liner and is collecting in the well may be circulated to the surface by the foam. Further, any sand or other material in the well may also be circulated to the surface with the foam. Methods and apparatus for preforming and circulating foam are disclosed and claimed in U.S. Pat. Nos. 3,463,231; 3,486,560; and 3,559,739. The disclosure of such patents is incorporated herein by reference.

In order to facilitate the understanding of the present invention the preferred embodiment of apparatus will be generally discussed from top to bottom in relation to FIG. 1. The apparatus of the present invention is hung above and in the well by means of elevators 20 and suitable long links 22 and 24. The links 22, 24 are connected to a traveling block (not shown) on the conventional hoist which is utilized to move the elevators up and down thereby raising or lowering the apparatus of the present invention.

A conventional plug valve indicated generally by the number 26 is attached to the upper end of small diameter tubing 28. The plug valve operates to close off the upper end of the tubing 28. The valve 26 may be opened to insert objects in the interior of the tubing string if one desired. A high pressure rotating swivel 30 having an inner flow path therethrough is rotatably connected on a tubing means between tubing 28 and tubing 32. A high pressure liquid source is connected through a suitable conduit 34 to the high pressure rotating swivel 30 to provide a flow path for high pressure liquid into the tubing string which forms a first flow path down the well.

A larger diameter tubing 36 is concentrically arranged around inner tubing 32 below the high pressure rotating swivel 30. The upper end of the larger diameter tubing 36 is coupled to a rubber tubing stripper 38 by collar 40. The rubber tubing stripper 38 contains an inner rubber stripper which seals off the upper end of tubing 36 against tubing 32. A rotating clamp indicated generally as 42 is connected between the inner tubing string 32 and the outer tubing string 36 to cause the tubing strings 36 and 32 to be rotated together. A rotating head 44 is seated on elevator 20 to permit rotation of the dual tubing strings 36, 32 while the tubing strings are being hung from elevator 20. Although it is recognized that a number of segmented sections are connected together to form tubing string, the inner and outer tubing strings in the present invention will be numbered 32 and 36, respectively, to facilitate description of the invention. A conventional power rotating swivel 46 is connected onto outer tubing string 36 so that the tubing string may be rotated as desired. As noted, rotation of outer tubing string 36 causes inner tubing string 32 to also rotate because of the connector clamp 42. The annulus formed between the two concentric tubing strings 32, 36 forms a second flow path down the well. A foam swivel 48 is rotatably connected to the outer tubing string 36. A foam source is connected through a suitable conduit 50 to the foaming swivel 48 to provide foam for flow down the well in the annulus between outer tubing 36 and inner tubing 32.

The outer tubing string 36 below the foaming swivel 48 can be hung at the wellhead 52 by means of slips 54.

The inner tubing string 32 is run in compression and is supported on a crossover connection located near the jet tool. Stripper rubber 56 on the interior of the wellhead 52 prevents flow of fluid through the wellhead adjacent the outer tubing 36. Flow out from the well annulus 13 occurs through either blooie line 58 or kill line 60. Each of these lines is provided with appropriate valves to control flow into or out of the casing-tubing annulus.

The concentric tubing strings 36 and 32 extend down the well to a position adjacent the openings in a liner that are to be cleaned. A concentric string check valve indicated generally as 62 is located in the annulus between inner tubing 32 and outer tubing 36 preferably at a depth near the earth's surface but far enough down so that the liner can be washed up without pulling the check valve. Thus the check valve would be near the surface when the jetting operation is completed. The concentric check valve 62 permits downward flow of fluid through the tubing-tubing annulus but prevents backflow of fluids up this annulus. A jet washing tool indicated generally as 64 is connected to the lower end of the tubing strings. A suitable crossover connection 66 is utilized to connect the inner tubing string 32 with the jet washing tool 64. A closeable drop ball valve 67 is used to control flow through the lower end of tubing 32. One or more jets 68 are connected on jet tool 64 and provide a flow path for high pressure fluid from the interior of inner tubing 32 to the wall of the well liner. A sand bit 70 is connected to the lower end of the jet tool to assist in cleaning out sand and to provide mechanical centralization of the jet tool. The centralizing provided by the bit 70 is particularly important while the jet tool 64 is being run (lowered) into the well. If the jet tool 64 were not so centralized there is danger of the jets 68 being sheared off while the tool is being run. The jet tool 64 is hydrolically centralized during the jetting operation by the balanced placing of the jets 68. A suitable downwardly opening flapper valve contained in sub 72 permits downward flow of liquid through bit 70 and prevents backflow of fluid up the interior of the jet tool and tubing strings.

In accordance with the invention then, a flow path for high pressure liquid is provided from the surface of the earth to a position in a well adjacent a liner having openings which are to be jet cleaned. High pressure liquid is jetted against such a liner from a distance related to the diameter of the orifice used to form the jet. It has been found that to insure efficient and satisfactory opening of the closed slots or perforations that the jetted liquid must have the velocity of 700 feet per second and be directed against the liner from a distance between 5 and 10 diameters of the orifice used to form the jet. It has been determined that a standoff distance of more than 10 diameters is too great to insure substantially 100 percent cleaning of difficult material likely to be found in the openings of a well liner. When the standoff distance is reduced to less than 5 diameters the jet bodes are subject to undesirable errosion by splashback. A high pressure rotating swivel utilized on the tubing which forms the flow path for high pressure jet liquid permits rotation of the jetting string during jetting operations. The jetting string may also be reciprocated in the well during such operations and by combining a preplanned program of rotation and reciprocation substantially complete coverage of the liner with the high pressure jet can be obtained.

A concentric outside tubing string is also provided and forms an annular flow path from the surface to a point below the jet washing tool so that a circulating medium, such as foam, can be injected and circulated as desired before, during or after the high pressure jet washing operation. Since the foam flow path terminates below the jet tool foam amy be circulated up past the jet tool to free it should it become sanded in. Thus much closer tolerances between the tool and the casing are possible than would ordinarily be the case. The outer tubing is provided with a foaming swivel which permits injection of foam to the tubing annulus during rotation and reciprocation of the tubing strings. The tubing strings are locked together so that rotation and reciprocation occur simultaneously in the tubing strings.

Figure 2:
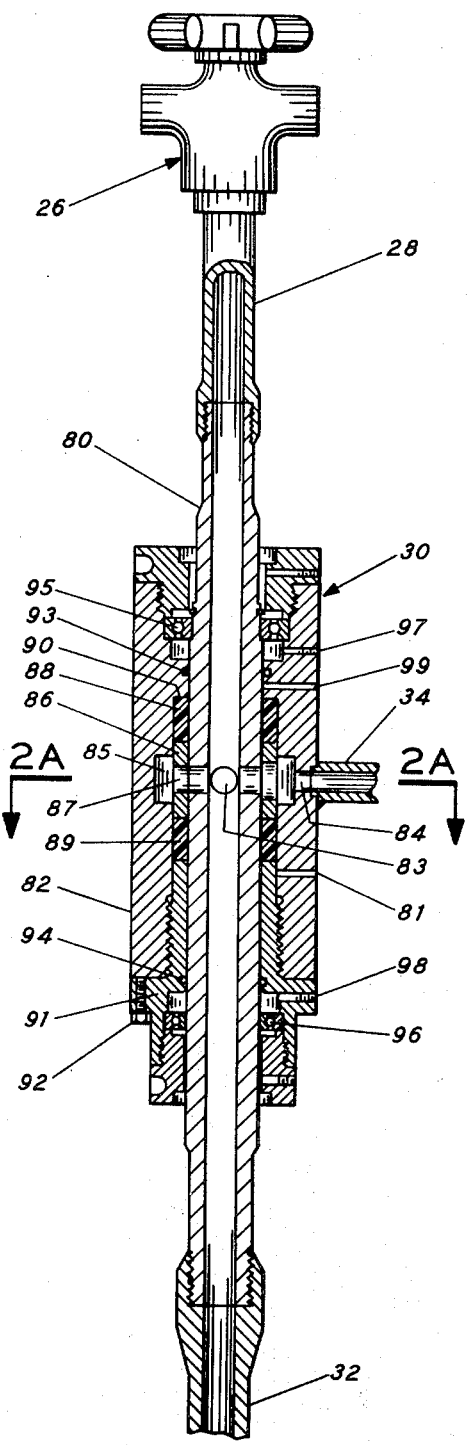
FIG. 2 is an elevation view, partially in section, and illustrates in greater detail the high pressure rotating swivel of the preferred embodiment of apparatus.
Figure 2A:
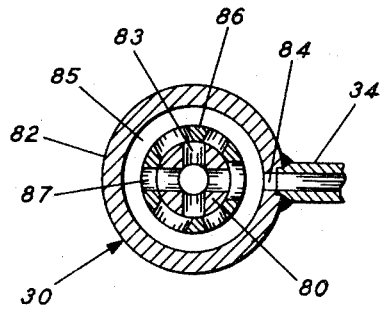
FIG. 2A is a sectional view taken at line 2A—2A of FIG. 2.
Figure 3A:
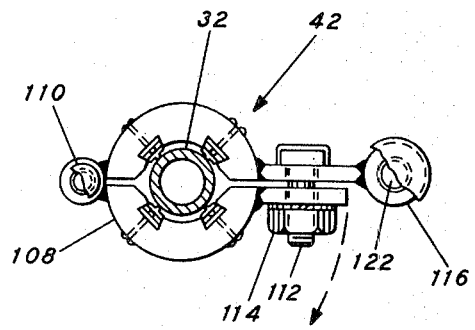
FIG. 3A is a sectional view taken at line 3A—3A of FIG. 3.
Figure 6A:
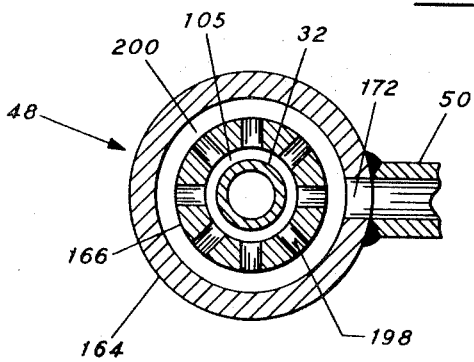
FIG. 6A is a section view taken at line 6A—6A of FIG. 6.
Figure 8A:
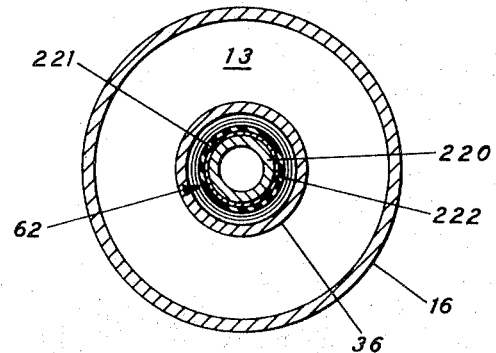
FIG. 8A is a sectional view taken at line 8A—8A of FIG. 8.
Figure 10A:
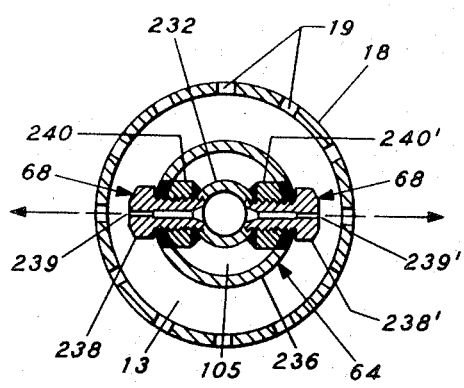
FIG. 10A is a sectional view taken at line 10A—10A of FIG. 10.
Figure 12:
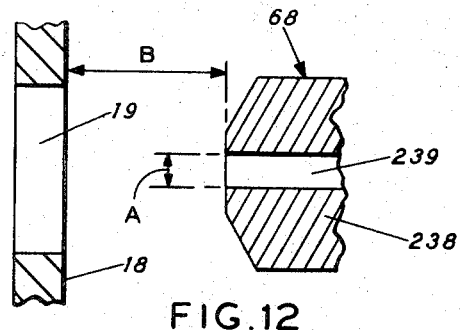
FIG. 12 is a detail view of the jet body and a well liner showing standoff distance in accordance with the present invention.
Figure 7:
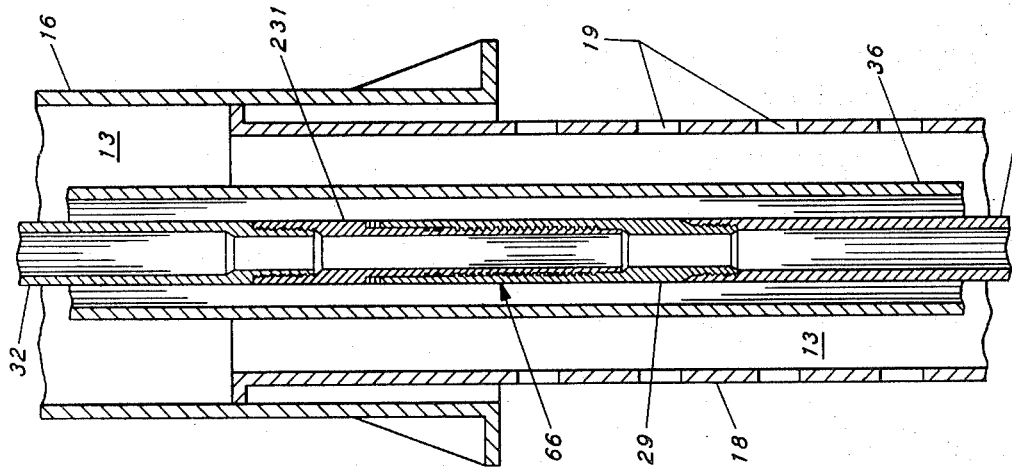
FIG. 7 is an elevation view, partially in section and illustrates the wellhead and tubing slips of the preferred embodiment of apparatus.
Figure 8:
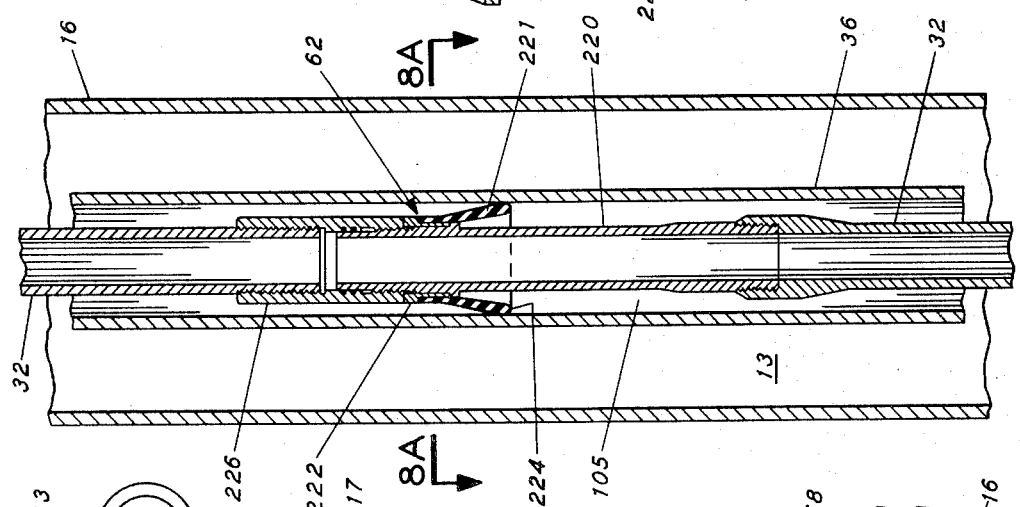
FIG. 8 is a sectional elevational view illustrating the concentric check valve of the preferred embodiment of apparatus.
Figure 9:
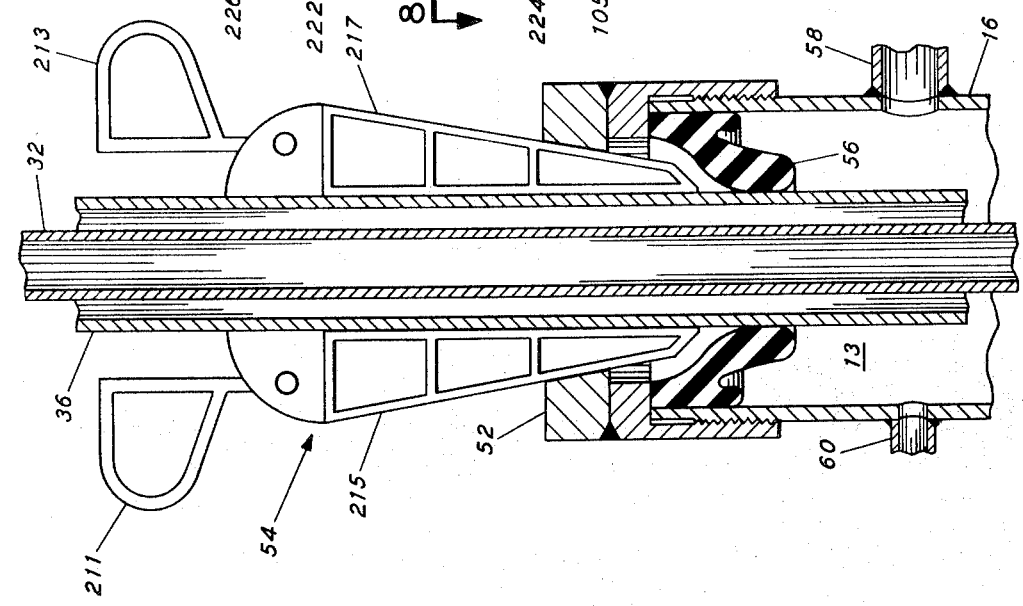
FIG. 9 is a sectional view and illustrates the crossover connection of the preferred embodiment of apparatus.
Figure 11:
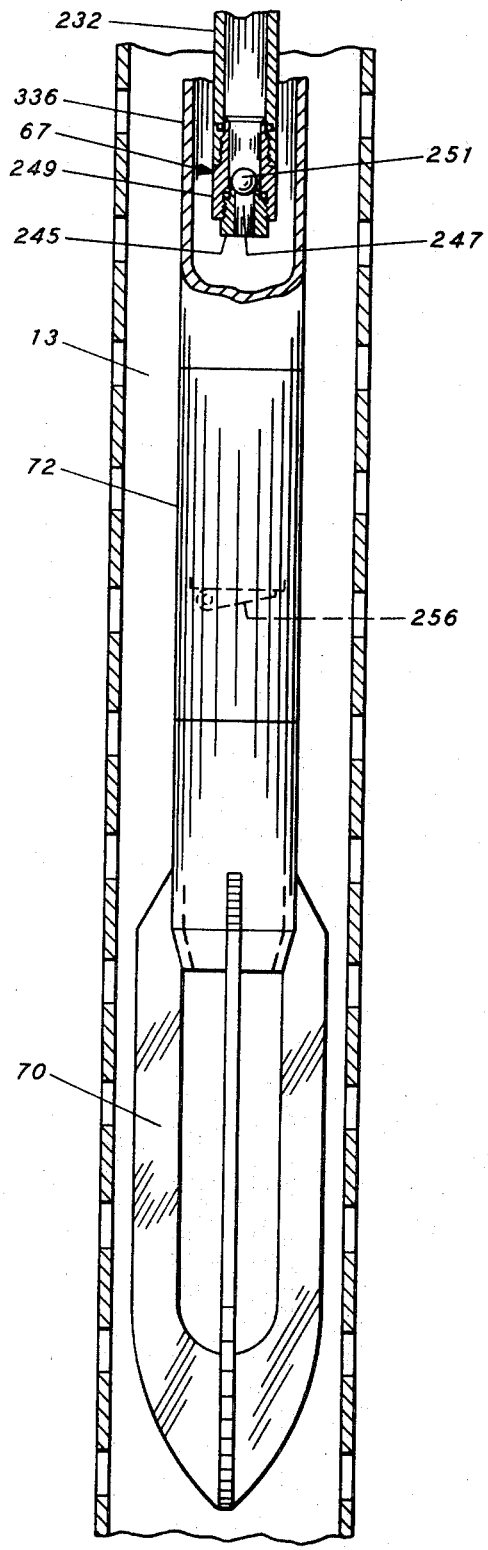
FIG. 11 is an elevation view with portions broken away for clarity of presentation and illustrates the drop ball valve and bit of the preferred embodiment of apparatus.
Figure 10:
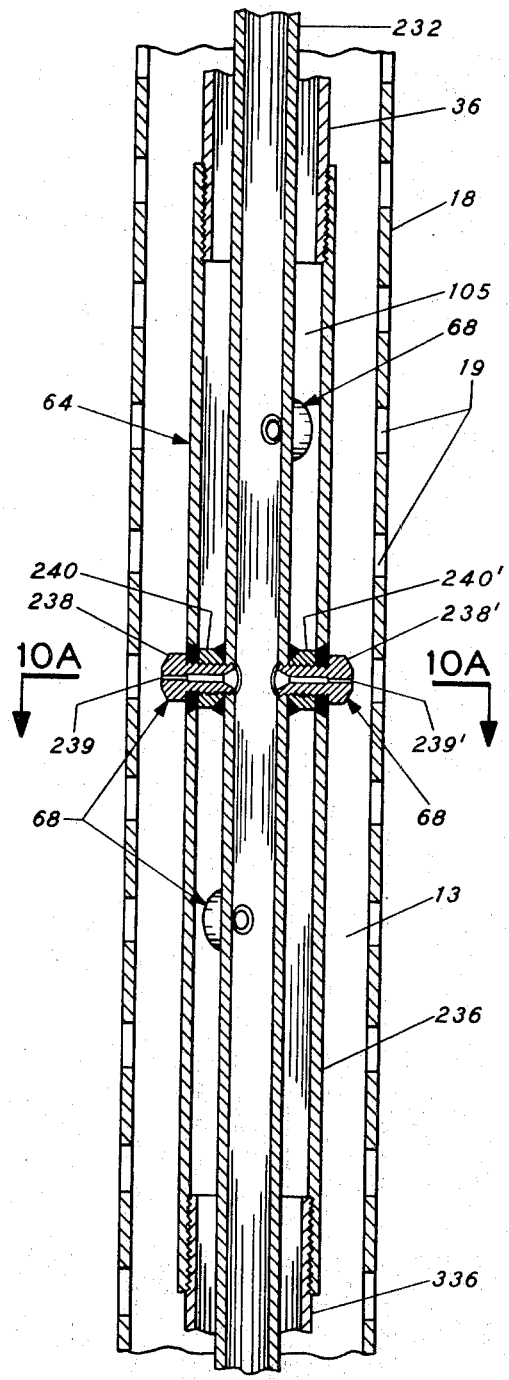
FIG. 10 is a sectional view and illustrates the jet tool of the preferred embodiment of apparatus.

The apparatus of the present invention will be discussed in greater detail with reference to FIGS. 2 – 12 and the various sections thereof. Briefly, FIGS. 2 and 2A show the concentric rotating swivel; FIGS. 3 and 3A show the safety clamp and rubber tubing stripper; FIG. 4 shows the elevators and rotating head; FIG. 5 shows the power rotating swivel; FIGS. 6 and 6A show the foam swivel; FIG. 7 shows the wellhead and tubing slips; FIGS. 8 and 8A show the concentric check valve; FIG. 9 shows a suitable crossover connection; FIGS. 10 and 10A show the jet tool; FIG. 11 shows the drop ball valve and the bit; and FIG. 12 shows standoff distance in accordance with the invention.

The high pressure liquid is introduced into the inner tubing string 32 as shown in FIGS. 2 and 2A by means of a high pressure rotating swivel indicated generally by the number 30. A mandril section 80 is rotatably mounted in a central opening of a housing member 82. The mandril 80 has a longitudinal flow path through its entire length and has suitable pipe threads at both ends for connecting into tubing string 32 at the lower end and plug valve 26 at the upper end. An opening such as holes 83, is formed in the intermediate portion of the mandril 80 to permit communication through the mandril to the interior of the tubing string 32. The holes 83 are aligned with the port 84 forming a flow path through the side wall of housing member 82 of the rotating swivel. The total area of the hole or holes 83 should be at least as great as the cross-sectional interior flow area of the tubing string 32. Tubing 34 connects flow path 84 of the housing 82 to a source of high pressure liquid. Thus the high pressure liquid has a flow path into the interior of tubing 32 through the port 84 and the annular chamber 85 formed in the inner wall of housing member 82 and thence through the holes 83 in the mandril 80. A spacer insert 86 having a plurality of holes 87 aligned with holes 83 of the mandril is used to space fluid-tight packing 88 and 89 above and below, respectively, the high pressure liquid entry system. A shoulder 90 in the interior of housing 82 forms an abutment for the upper packing 88 which, in turn, supports spacer 86 and lower packing 89. A packing retainer nut 91 is threadably engaged in the lower portion of housing 82 and is used to compress the packing a suitable amount. A lock bolt 92 engages through a hole in the packing retainer nut and engages against the housing 82 to lock the packer retainer nut in suitable position. O-ring seals 93 and 94 assist in packing off the mandril and the housing member.

The tubular mandril 80 is rotatably mounted in the rotating swivel by suitable ball bearing sets 95 and 96. Grease fittings 97 and 98 are useful to lubricate the ball bearings. A relief hole 99 is formed in the housing member 82 and communicates with the inner chamber thereof between the major packing 88 and the upper o-ring 93. In this manner if the packing fails the high pressure liquid can escape through the relief hole 99 without damaging the ball bearings. A second relief hole 81 is also formed in the housing 82 and communicates with the inner chamber thereof between the lower major packing 89 and lower o-ring 94 to serve a similar function for the lower portion of the rotating swivel.

Figure 3B:
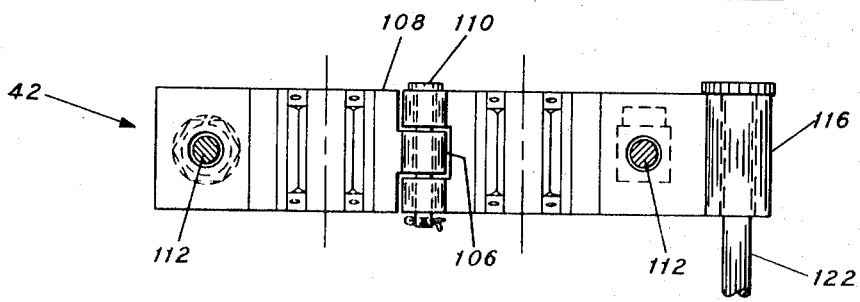
FIG. 3B is a layout view of a portion of the apparatus illustrated in FIG. 3.

FIG. 3 and FIG. 3A illustrate the concentric string clamp 42 and the concentric string stripper assembly 38. FIG. 3B is a view of the upper portion of the clamp 42 in an opened position. Inner tubing string 32 extends through the clamp 42 and the stripper assembly 38. A suitable collar 40 connects larger diameter tubing 36 with a bell sub 100. The bell sub 100, in turn, is connected by collar 101 to cap 102 and collar 103 which has an opening to slidably engage tubing 32. Stripper rubber 104 prevents flow between the outside of tubing 32 and collar 103. In this manner, the upper end of the annular chamber 105 between the inner tubing 32 and the outer tubing 36 is closed off.

The inner tubing string 32 and the outer tubing string 36 are clamped together for rotational and reciprocal movement by concentric string clamp 42. A pair of gripping members 106 and 108 are swingably mounted on hinge pin 110. The gripping members are engaged around tubing 32 and locked in place by means of bolt 112 and nut 114. A sleeve 116 is formed at the end of member 108 and a corresponding sleeve 118 is fixedly connected by bar extension 120 to the outside tubing string 36 by means of collar 40. A locking pin 122 is inserted through the axially aligned holes in the sleeves 116 and 118 to lock the inner tubing string 32 and the outer tubing string 36 together for rotation.

FIG. 4 illustrates the elevators 20 and the rotating head 44. The elevators are suspended from a suitable hoist by means of links 22 and 24. The links are U-shaped and the back portion of each link is not shown in the drawing. The links 22 and 24 are held under flanges 123 and 125, respectively, and maintained in place by pins 127 and 129 which engage between the upper flanges 123 and 125 and lower flanges 131 and 133. Swinging doors 135 and 137 open to permit easy insertion and removal of tubing into the elevators. The rotating head 44 sits on top of the main deck 139 of the elevators.

The rotating head 44 is provided with a central opening to freely receive the inner and outer tubing strings. This permits the tubing string to be rotated while being held in the elevators. More specifically, an outer case member 141 rests on the upper surface 139 of the elevators, a bearing support member 143 is threadably engaged into case member 141 and a cap member 145 is connected by bolts 147, 149 to the cap member. Each of these three members is provided with a central opening to receive a mandril section 151. The ends of the mandril section are threadably connected to the outer tubing string 36. This arrangement cooperating with the inner tubing 32 continues annulus 105 which forms the foam flow path down the well through the rotating head. Mandril section 151 includes an annularly extending shoulder portion 153 which engages into a recessed portion 155 of bearing support member 143. An annularly extending thrust bearing 157 provides a running surface between shoulder 153 and the bearing support member 143. Suitable annular packing rings 159 and 161 are provided to seal off the bearing chamber.

FIG. 5 illustrates in greater detail a power rotating sub 46. Generally stated the function of the rotating power sub is to rotate outer tubing string 36. A suitable power rotating sub for use in the present invention is the Bowen PS–2 power sub described and illustrated in the 1968–69 Composite Catalog of Oil Field Equipment and Services, at pages 636 and 637. Briefly, the power rotating sub utilizes a hydraulic motor 202 having motor manifold 204 to drive a main gear (not shown) inside of gear box 206. Telescoping torque reins 208 and 209 extend from the main gear box body 206. The power rotating sub permits carrying the annular flow path 105 through the sub.

FIGS. 6 and 6A illustrate in detail foam swivel 42. The foam swivel 42 permits injection of foam through conduit 50 into the annulus 105 between the inner tubing string 32 and the outer tubing sring 36. A foaming swivel is rotatably mounted with respect to the tubing strings so that the tubing strings may be rotated inside of the foam swivel 42.

More specifically, the foam swivel includes an outer housing 164 which has a central opening therein to receive a mandril section 166. The mandril section 166 has a central opening through its entire length and is threadably connected at either end with outer tubing string 36 to provide a continuation of annular flow path 105 through the foam swivel 42. Two sets of annular tapered roller bearings 168 and 170 are provided above and below a foam entry port 172 in outer housing 164. Roller bearings 168 are packed off above by annular packing ring 174 and below by annular o-rings 176 and 178. The lower annular bearing 170 is packed off below by annular packing ring 180 and above by o-rings 182 and 184. Grease openings 186, 188, 190 and 192 are provided in the outer case 164 for lubricating the bearings. Upper cap collar 194 and lower cap collar 196 threadably engage in the outer housing 164 to maintain the bearings in place. Mandril section 166 is provided with an opening such as one or more holes 198 intermediate its length. These holes 198 are positioned adjacent an annularly extending recess 200 in the inner wall of housing members 164. Entry port 172 communicates with the annular chamber 200 so that fluid injected into the chamber through conduit 50 will enter the interior of the mandril through the annular chamber 200 and the holes 198 in the mandril. In this manner foam may be injected into the annular space 105 between the tubing strings 32, 36. This annular conduit provides a flow path for foam down the well.

FIG. 7 shows in more detail the tubing hanging slips 54 and the wellhead 52. The tubing hanging slips 54 are adapted to engage and disengage outer tubing string 36 to hang the tubing string 36 in the well. Handles 211 and 213 are used to engage and disengage the jaws 215 and 217 of the slips against the tubing string 36. An annularly extending stripper rubber 56 seals off the annular space 13 between the casing 16 and the outer tubing string 36. Flow into and out of the casing-tubing annulus 13 is accomplished through blooie line 58 or kill line 60.

FIGS. 8 and 8A illustrate the concentric check valve which is indicated generally by the number 62. The function of the check valve is to close off the annulus 105 between the outer tubing string 36 and the inner tubing string 32 to flow in an upward direction. Concentric check valve 62 permits flow in a downward direction in this annular flow path. The concentric string check valve includes a tubular mandril section 220 having a central opening over its entire length. The lower end of the mandril section is connected into tubing string 32. An annular-depending truncated cone-shaped resilient member 221 is engaged over the outside of the tubular mandril section 220. The tapered end of the resilient member 221 is fitted over sleeve 222 and the flared end 224 of the resilient member engages against the interior wall of tubing section 36. A collar member 226 connects the upper end of mandril section 220 to interior tubing string 32 and additionally forces the resilient member 221 out against the interior wall of the outer tubing string 36.

The resilient member is preferably made of rubber. A preferred form of rubber is buytle N. In a particular instance for a concentric check valve for use in a 350 psi foam system such rubber material having Shore hardness of 70 gave excellent results. It should be noted that a similar material having a Shore hardness of 40 was too soft to prevent flowback and a similar material having a Shore hardness of 90 was too hard to allow pump by of the foam.

FIG. 9 illustrates in greater detail the liner 18–casing 16 juncture and illustrates a crossover connection between inner tubing string 32 and the jet washer tool. This crossover connection 66 facilitates connecting tubing string 32 into the jet washing tool after the tool has been run into the well on outer tubing string 36. Briefly, the crossover connection includes a sub 229 connected into the inner tubular member 232 of the jet washer. Sub 229 has interior square threads at its upper end which are adapted to easily receive similar threads on the outside of tubing sub 231. The square threads contain o-rings to seal the connection. Tubing sub 231 is connected at its upper end to tubing string 32. In this manner tubing string 32 can be run into the hole with tubing sub 231 connected to its lower end and a remote connection can be easily made between tubing sub 231 and crossover sub 229 which had been previously run with tubing string 36.

FIGS. 10 and 10A illustrate jet washing tool 64 in more detail. As noted above, the jet tool 64 is positioned adjacent well liner 18 which has slots 19 which need cleaning. An inner tubular member 232 having its upper end connected to inner tubing string 32 extends the length of the jet tool 64. One or more jets 64 are connected to inner tubular member 232 and extend through outer tubular member 236. The outer tubular member 236 has its upper end connected to tubing string 36 and continues to form annulus 105 with inner tubular member 232. The jets communicate with the interior of tubing member 232 and the annular space 13 between the outer tubing 36, 236 and the casing 16–liner 18. The jets comprise a jet body 238 having a central opening 239 formed therein. The jet body thus forms the orifice through which the jet is formed. A jet seat member 240 having interior threads is fixedly connected between inner tubular member 232 and outer tubular members 236 by suitable means such as welding. The tubular members have axially aligned openings to receive the jet seat member. The jet seat members 240, 240' serve the dual function of seating the jet bodies 238, 238' and maintaining tubular members 232 and 236 in predetermined spaced-apart relationship. A jet body has an exterior thread portion adapted to be mated with the interior threads of jet seats 240. The jet bodies, therefore, may be turned in or out to adjust the standoff distance between the exit of the jet from orifice 239 to the well liner. This distance is adjusted so that the exit of the jet from the jet body 238 at orifice 239 is between 5 and 10 times the diameter of the orifice 239 formed in the jet. In other words, the diameter of the jet as it leaves the tip of jet body 238 determines the standoff spacing of the jet. This is clearly shown in FIG. 12. Note that the distance B—B must be from 5 to 10 times the distance A—A. Also the length of the orifice having the diameter A—A should be at least 5 times the diameter A—A.

The lower end of tubular member 236 is connected to a tubular sub 336 leading to the check valve and bit. FIG. 11 illustrates in more detail the drop ball valve indicated generally by the number 67 and bit 70. The lower end of the inner tubular member 232 terminates in a ball valve seat. Thus ball valve seat member 245 having a central opening 247 of reduced diameter is connected to inner tubular member 232 by crossover sub 249. A ball 251 having a diameter smaller than the overall inner diameter of the flow path 32, 232, 249 but larger than the reduced diameter 247 of ball valve seat 245 is shown resting in the ball valve seat to close the flow path above such valve. The ball is introduced into the inner tubing string 32 at lock valve 26. It is noted that prior to introduction of the ball, fluid may be circulated through the inner tubing string flow path 32, 232 and the well annulus 13.

A flapper valve sub 72 is connected to the tubular sub 336 and contains a conventional downwardly opening flapper valve indicated in dashed lines at 256. A sand bit 70 is connected below the flapper valve sub 256 and is useful in removing sand or other debris from the well in conjunction with foam injected down the annulus between the inner tubing and outer tubing. The foam goes through the flapper valve 256 and is then ejected out of the lower portion of bit 70 and circulates sand or the debris to the surface via annulus 13 and out blooie line 58. The bit 70 is also very important in providing mechanical centralization of the jet tool during running of the tool in the well on the outside tubing string. Thus the blades of the bit 70 are selected to be only slightly less in diameter than the inside diameter of the liner which is to be cleaned.

The use of relatively smaller diameter jet orifices of less than one-eighth inch in the present invention has the advantage of reducing to a minimum the amount of liquid being injected into the well. This reduces the horsepower requirements. Further, the lower volumes of liquid reduce the possibility of the liquid column in the well overpowering the formation and doing formation damage. Table I below indicates the effect of jet size on flow volume and standoff distance on power. It also illustrates the difference in fluid requirements to obtain the necessary jet velocities with different sized jets. As noted, it has been discovered that small diameter jets at the higher velocities taught herein are effective in cleaning liner openings of substantially all plugging material.

TABLE I

EFFECT OF JET SIZE ON FLOW VOLUME AND JET STAND-OFF ON POWER LOSSES

| Size Jet | GPM at 7000 PSI | Full Power (6D) | 1/10 Power (12D) | 1/100 Power (28D) |
|---|---|---|---|---|
| 1/32" | 1.94 | 0.187" | 0.374" | 0.784" |
| 1/16" | 7.8 | 0.375" | 0.750" | 1.75" |
| 1/8" | 31.2 | 0.750" | 1.36" | 3.50" |

Table II below summarizes results obtained in high pressure jet cleaning of plugged liners. The data in Table II indicates that jet velocities in excess of 700 feet per second are needed to obtain substantially complete cleaning of the plugged openings. In this regard many different types of plugging material are encountered in wells. It is important that the openings be substantially 100 percent cleaned, so therefore the most difficult material must be removed. This can be doen if velocities and standoff distance are maintained in accordance with this invention. The cleaning liquid, which in this instance was water, was jetted through a 1/16 inch jet orifice at pressures in excess of 6,000 pounds per square inch. The environmental fluid through which the water was jetted was either foam or water as indicated. The data indicates that a standoff distance of greater than one inch with a 1/16 inch diameter jet orifice is too great for effective cleaning. A 5/8 inch standoff or less is preferred using a 1/16 inch jet orifice. An angled jet is somewhat more efficient than a head-on jet. In order to clean substantially all the slots, a standoff distance of less than 10 diameters is required. All tests were done with 1/16 inch nozzle. The liners were 5½ and had 40 mil slots on 3 inch centers. The rotation rate of the liner was 30-35 RPM. Vertical movement rate of the nozzle was 2 inch/min. Tests 1 through 12 were on one liner and 13 through 15 on another.

TABLE II

| Test No. | Fluid Environment | Pressure PSIG | Jet Velocity | Stand-off Inches | Conclusion |
|---|---|---|---|---|---|
| 1 | Water | 6,000 | 945 | ⅜ | All slots cleaned. |
| 2 | Water | 6,000 | 945 | ¾ | All slots clean. |
| 3 | Water | 6,000 | 945 | 1⅛ | It was decided tests should be continued before deciding. |
| 4 | Water | 6,000 | 945 | 1⅛ | Continuing 3 — Estimated 60% clean. |
| 5 | Water | 6,000 | 945 | 1½ | Penetrated slightly into nearly all slots but did not clean hardly any all the way through. |
| 6 | Water | 7,000 | 1,020 | 1½ | Same as 5. |

TABLE II-Continued

| Test No. | Fluid Environment | Pressure PSIG | Jet Velocity | Stand-off Inches | Conclusion |
|---|---|---|---|---|---|
| 7 | Water | 7,000 | 1,020 | 1½ | Nozzle was not moved in this test. Liner was rotated 5 mins. 90% of slots were clean for about ½" length. |
| 8 | Water | 7,000 | 1,020 | 1⅛ | 50–60% of material in slots was removed. Only ~20–30% of slots completely clean. |
| 9 | Foam | 7,000 | 1,020 | 1⅛ | 50–60% clean — Similar to 8. |
| 10 | Foam | 6,000 | 945 | 1⅛ | Same result as 9. |
| 11 | Foam | 6,000 | 945 | ¾ | 80–90% of material removed but only about 50% of slots were completely clean. |
| 12 | Foam | 7,000 | 1,020 | ¾ | Same as 11. |
| 13 | Foam | 7,000 | 945 | ½ | Half of a 3 foot liner section was used. 50–75% of slots were completely cleaned. |
| 14 | Foam | 7,000 | 945 | ½ | Second half of liner section was cleaned. Nozzle with 10° angle upward was used. Result was similar to 13 — slightly better. |
| 15 | Water | 7,000 | 945 | ⅝ | Liner in 13 and 14 was cleaned second time — 75–90% of slots were now open. |

Table III below summarizes additional results obtained in high pressure jet cleaning of plugged liners. The data in Table III indicates that jet velocities in excess of 700 ft. per second are needed to obtain satisfactory cleaning of the openings. In some of these runs gas was entrained in the liquid. This gave poor results indicating that liquid alone should be used as the jetting media. The data also reveals that the smaller diameter 1/16 inch jet is at least as effective as the larger ⅛ inch diameter jet in cleaning the openings. The runs were conducted in an air environment. The data for liner No. 7 indicates that cleaning at a standoff distance of about 13 diameters for some material in some openings is ef-

TABLE III

| | No. Jets | Size of Jets | Jetting Time Minutes | Liquid Pump Rate GPM | Nitrogen Rate SCFM | Pump Pressure PSI | Jet Velocity Ft/Sec | Jet Stand-off | Observed Perforation Cleaning | Evaluation |
|---|---|---|---|---|---|---|---|---|---|---|
| Liner No. 1 6⅝" 60M | 2 | ⅛" | 2 | 52 | 0 | 6000 | 783 | 1.06" | missed perforations | Advanced too fast, 26'/min while rating 90RPM. |
| Partially plugged with soft asphaltenes and clays. | 2 | ⅛" | 2 | 30 | 800 | 7000 | 638 | 1.06" | fair | Slowed forward motion with friction on liner. The driving roller slipped which caused them to transport the loose plugging material on the outside of the liner into the cleaned perforations. This driving method masked the cleaning action. Removed electric motor from the driven roller train and substituted a pneumatic motor to slow the liner rotational speed from 90 to 5–10 RPM. The pitch of the driving rollers caused the liner to be cleaned to advance 3.5 inches per revolution. |
| | 2 | ⅛" | 2 | 38 | 1100 | 9100 | 773 | 1.06" | poor cleaning | Jet seemed to be ineffective plus had trouble hitting perforation w/only 2 jets. |
| | 3 | ⅛" | 3 | 60 | 0 | 9500 | 910 | 1.06" | fair | All perforations hit were cleaned except the high pressure loosened the milled burrs which were driven into the perforations and provided for a partial plug. Energy level probably too high. |

TABLE III—Continued

| | No. Jets | Size of Jets | Jetting Time Minutes | Liquid Pump Rate GPM | Nitrogen Rate SCFM | Pump Pressure PSI | Jet Velocity Ft/Sec | Jet Stand-off | Observed Perforation Cleaning | Evaluation |
|---|---|---|---|---|---|---|---|---|---|---|
| | 2 | ⅛" | 5 | 25 | 450 | 4000 | 563 | 1.06" | poor cleaning | Did not seem to be able to get jets to hit plugged portion of perforations. |
| | 4 | ⅛" | 11 | 84 | 0 | 4000 | 753 | 1.06" | excellent | Polish cleaned — all slots opened. Four jets solved indexing problem. |
| Liner No. 2 6⅝" 60M | 4 | ⅛" | 8 | 82 | 0 | 4000 | 700 | 1.06" | poor to fair | Partially opened perforations. Checked jets — all opened. Repositioned for rerun. |
| Partially plugged with soft asphaltenes, hard scale and rust. | 4 | ⅛" | 5 | 65 | 500 | 4100 | 615 | 1.06" | poor | Didn't clean all of perforations. |
| | 4 | ⅛" | 6 | 100 | 0 | 6000 | 1030 | 1.06" | good | Cleaned all perforations except where products of corrosion were present. |
| Liner No. 3 6⅝" 60M | 4 | ⅛" | 10 | 84 | — | 4000 | 753 | 1.15" | good | Poor test because of soft plugging material. |
| Plugged with soft asphaltenes. Liner No. 4 6⅝" 60M | 4 | ⅛" | 7 | 53 | 450 | 3000 | 505 | 1.15" | poor | Had very low indicated energy level. Seems that entrained gas softened blow — acts like shock absorber. Unplugged estimated 20% of perforations hit. Overall, about ±10% of perforations opened. |
| Plugged with soft asphaltenes | 4 | ⅛" | 7 | 90 | — | 4000 | 870 | 1.15" | good | Cleaned most of perforations — estimate 98% cleaned. |
| Liner No. 5 6⅝" 60M | 4 | ⅛" | 4 | 90 | — | 4000 | 870 | 1.15" | fair | Partially cleaned perforation. |
| Hard weathered plugging material of scale, cement and rust. See Pictures. Liner No. 6 5½" 60M | 4 | ⅛" | 5 | 105 | — | 6000 | 1115 | 1.15" | good | Estimate 98% effective cleaning job. Believe balance of problem is that of indexing jet so that it hits all of the perforations. |
| | 4 | ⅛" | 6 | 71 | 1125 | 6000 | 667 | 0.95" | very poor | Very low energy level indicated. Estimate ±5% of perforations cleaned. |
| Hard weathered asphaltenes and clays. | 4 | ⅛" | 5 | 105 | — | 6000 | 1115 | 0.95" | very good | Rewashed ½ liner with water-detergent solution. All perforations cleaned. |
| | 4 | ⅛" | 6 | 70 | 1125 | 6000 | 660 | 0.95" | very poor | Rewashed ½ liner with foam. Very low energy level indicated. Presence of compressable gas seems to dampen jetting action. Estimate 25% of perforations open. |
| Liner No. 7 5½" 60M | 2 | 1/16" | 12 | 10 | — | 6000 | 705 | 0.86" | excellent | Jets failed to hit all of perforations due to spacing and advancing speed. Cleaned all perforations hit. |
| Plugged with hard rust scale and hydrocarbons | 2 | 1/16" | 7 | 15 | — | 10,000 | 1600 | 0.86" | | All perforations cleaned and end of this test. | fective. However, to insure substantially complete cleaning of openings having various plugging materials, it is necessary to be within 10 diameters when jetting.

Field operations were conducted in a number of California wells having liners whose openings were plugged to the point that production had declined to below a desirable rate. In instances where the jet standoff distance was below 5 diameters of the jet there occurred excessive erosion of the jet body from splash back. Thus, although successful cleaning can be accomplished at very close range, it is preferred to maintain at least a standoff distance of 5 diameters to prevent erosion of the jet body. The results of field operations are summarized in Table IV below. The concentric string apparatus disclosed in this application was utilized in Wells A, B and C. A single string apparatus was utilized in Well D. Foam was used prior to, concurrent with and after the jetting in Wells A, B and C.

TABLE IV

| Well | Jet Size | Jet Velocity F.P.S. | Jet Standoff In Jet Diameters | Jet Liquid | Daily Production Before Oil/Water | Daily Production After Oil/Water | Remarks |
| --- | --- | --- | --- | --- | --- | --- | --- |
| A | 1/16" | 945–1015 | 8.35 | $H_2O$ | 17/90 | 46/303 | Well had previously been string shot with favorable results but had rapid production decline. Well is in steam displacement project. |
| B | 1/16" | 945–1000 | 4.65 | $H_2O$ | 4/35 | 35/33 | Operation successful in opening slots. Short standoff distance resulted in excess erosion to jet body due to excessive splash back. Prefer 5 diameters minimum. |
| C | 1/16" | 1000–1050 | 4.0 | $H_2O$ | 7/5 | 19/11 | Jet washed well evaluated production — then preformed cyclic steam injection operation. Daily production after steaming was 105 oil and 104 water. Without jet washing would estimate production limited to 40 oil and 20 water. Minimum standoff again caused erosion of jet body. |
| D | 1/32" | 1000–1050 | 6.0 | $H_2O$ | 4/5 | 24/125 | Jet washed the liner. Then foam cleaned well after jetting. Then steamed well and returned to production. |

SUMMARY OF ADVANTAGES OF PRESENT INVENTION

The present invention provides methods and apparatus for jet cleaning plugged openings in well liners. A principal advantage of the present invention is the ability to apply high energy directionally to clean openings in well liners. In accordance with the invention the directional application of high energy is done with high velocity liquid through small diameter jet orifices. Thus, the invention has the advantage of requiring relatively low horsepower. Further, liquid volume required to do the cleaning is also reduced. The apparatus of the invention permits rotation and reciprocation of the jet tool in the well during high pressure jetting to provide for the directional application of the cleaning energy. Thus new swivels, jet tools and a check valve are provided. Additional advantages will be apparent to those skilled in the art.

I claim:

1. A rotating swivel comprising a housing member having a central opening through its entire length, a tubular mandril having a central flow opening through its entire length positioned in the central opening of said housing member, means for closing off one end of said central flow opening of said tubular mandril to flow, means on the other end of said tubular mandril adaptable to be connected with a tubing string, bearing means rotatably mounting said mandril in said central opening of said housing member, said bearing means including ball bearing sets positioned above and below the aftersaid opening intermediate the ends of said mandril, an opening comprising a plurality of holes in the wall of said mandril intermediate the ends of said mandril forming a mandril flow path from the outside of said mandril to the central flow opening of said mandril, the total area of said holes being at least as large as the cross-sectional flow area of the central flow opening of the mandril, port means forming a housing flow path through said housing member communicating with the opening intermediate the ends of said mandril, said port means being arranged to provide such communication continuously during rotation of said mandril with respect to said housing member, a spacer insert having a plurality of holes aligned with said port means of said housing member and said opening of said mandril inserted between said housing member and said mandril, said housing member having an internal annular shoulder, packing means positioned between said housing member and said mandril immediately above and below said spacer insert and in contact therewith to prevent fluid flow to said bearing sets between said housing member and said mandril, relief holes in said housing member between each of said packing means and said bearing sets, retainer nut means threadably connected to one end of said housing member for compressing said packing means both above and below said spacer insert thereby applying equal pressure to both of the packing means, the upper packing means being compressed by said shoulder, and the lower packing means being compressed by said retainer nut means and means for connecting a conduit to said port means outside of said housing member.

* * * * *